United States Patent
Coon

[11] 4,106,855
[45] Aug. 15, 1978

[54] LENS ELEMENT INCORPORATING NARROW BANDPASS FILTER AND USABLE IN DUAL MODE

[75] Inventor: Bryan H. Coon, Seminole County, Fla.

[73] Assignee: Martin Marietta Corporation, Orlando, Fla.

[21] Appl. No.: 796,245

[22] Filed: May 12, 1977

Related U.S. Application Data

[63] Continuation-in-part of Ser. No. 604,365, Aug. 13, 1975, abandoned.

[51] Int. Cl.$^2$ .......................... G02B 5/10; G02B 5/28
[52] U.S. Cl. ...................................... 350/196; 350/27; 350/201; 250/353
[58] Field of Search ............... 350/165, 199, 201, 196, 350/195, 27, 55; 250/353, 226

[56] References Cited

U.S. PATENT DOCUMENTS

| | | | |
|---|---|---|---|
| 3,191,497 | 6/1965 | Matsui | 350/199 |
| 3,858,046 | 12/1973 | Cubalchini | 350/195 |

OTHER PUBLICATIONS

McKenney, D. B. and P. N. Slater "Design and Use of Interference Passband Filters with Wide Angle Lenses for Multispectral Photography", *Applied Optics*, vol. 9, No. 11, Nov. 1970, pp. 2435-2440.

*Primary Examiner*—Conrad J. Clark
*Attorney, Agent, or Firm*—Julian C. Renfro; Gay Chin; James B. Eisel

[57] ABSTRACT

An optical system utilizing a lens element having a spherical surface incorporating a narrow bandpass filter, with the spherical surface being of such configuration that converging rays are normal to its surface, thereby permitting the narrow bandpass filter to operate with minimum bandwith, thus maximizing the rejection of unwanted background radiation. The surface of the lens element opposite the surface having the narrow bandpass filter may incorporate a dichroic filter, enabling the lens element to operate in a dual mode, with the dichroic filter reflecting entering visible light energy but being transparent to laser light energy, and the narrow bandpass filter thereafter eliminating wavelengths outside a given laser spectrum. As an example, my novel lens element may be used as a part of a catadioptric objective system sensitive to both visible and laser light frequencies.

15 Claims, 1 Drawing Figure

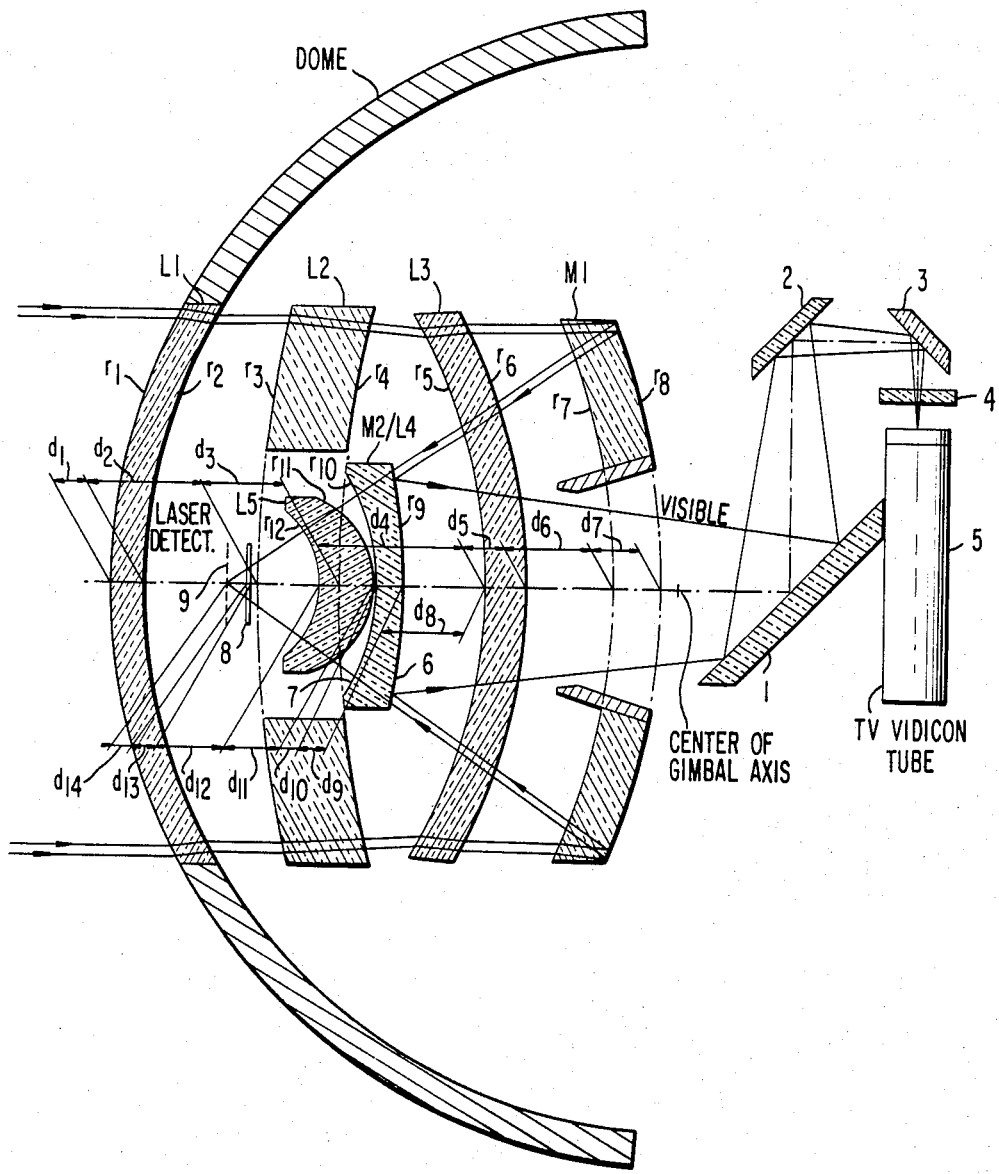

LENS ELEMENT INCORPORATING NARROW BANDPASS FILTER AND USABLE IN DUAL MODE

RELATION TO PRIOR INVENTION

This is a continuation-in-part of my copending application entitled "Dual Mode Catadioptric Objective", filed Aug. 13, 1975, Ser. No. 604,365 now abandoned.

FIELD OF THE INVENTION

The present invention generally relates to an electromagnetic energy reception system for simultaneously receiving electromagnetic energy having different frequencies, and more particularly, to a dual mode catadioptric objective system using a novel lens element optical system simultaneously operational for both visible and laser light frequencies.

SUMMARY OF THE INVENTION

The novel optical component and system in accordance with this invention advantageously enable a dual function to be performed within a comparatively small volume. The principal lens element of the system has a first surface upon which a dichroic filter is utilized, which is transparent to laser light energy, but serves to reflect entering visible light energy. The visible light energy may be focused by other components of the optical system upon a visible mode detector such as a TV vidicon tube.

The other surface of the principal lens element is a spherical surface incorporating a narrow bandpass filter, with the spherical surface being of such configuration that converging rays are normal to its surface, thereby enabling the narrow bandpass filter to operate with minimum bandwidth, thus maximizing the rejection of unwanted background radiation.

My novel lens element thus may function quite well in a dual mode catadioptric system in which a plurality of lenses and a Mangin mirror are utilized, and the visible light is directed to one utilization, whereas the laser energy is directed onto a laser detector.

A preferred embodiment involves the several components being disposed inside a transparent dome, preferably mounted in a gimbal assembly permitting rotation about the center of curvature of the dome. The long back focal length of the visible mode portion of the objective system enables the use of multiple folding mirrors for system compactness. Specifically, all of the optical elements provided in accordance with the depicted embodiment of this invention are contained in the forward 30 percent of the optical path, and are disposed in a straight line. This unique construction not only results in system compactness, but quite significantly, enables modular construction and ready testing of the objective system.

It is therefore a principal object of my invention to provide a novel lens element having a spherical surface incorporating a narrow bandpass filter, with the surface having a configuration such that converging rays are normal to its surface, thereby enabling the narrow bandpass filter to operate with minimum bandwidth, and thereby maximize the rejection of unwanted background radiation.

It is another object of my invention to provide a novel lens element incorporating on its surfaces a dichroic filter, and a narrow bandpass filter, such that it may operate in a dual mode utilization.

It is still another object of my invention to provide an optical system sensitive to both visible and laser light frequencies, and able to distinguish therebetween, such that each can be separately utilized.

BRIEF DESCRIPTION OF THE DRAWING

The specific nature of the invention, as well as other objects, aspects, uses and advantages thereof, will clearly appear in the following description and from the accompanying drawing in which the sole FIGURE is a schematic sectional view of an exemplary system in which my principal lens element may be used.

DETAILED DESCRIPTION OF THE PREFERRED EMBODIMENT

With reference to the drawing, the energy from both visible and laser light passes first through lens L1, which is a negative meniscus lens, formed as an integral part of an optional transparent dome that may be used to house and protect the optical system according to this embodiment of my invention. The visible and laser light energy in this embodiment then pass successively through a positive meniscus lens L2 and a corrector lens L3, to a Mangin mirror M1. As will be understood, the use of the corrector lens is occasioned by the use of the protective dome, and may of course be eliminated if the dome is not utilized.

Lens L2, like lens L1, is convex to the object, while corrector L3 and Mangin mirror M1 are concave to the object. From the Mangin mirror M1, both the visible and laser light energy are directed back through the corrector lens L3. At the convex surface of secondary mirror M2, the visible light energy is reflected to pass to a third time through corrector L3, through an aperture in the Mangin mirror M1 and is thereafter multiply reflected by planar folding mirrors 1, 2 and 3 through a filter 4 to a visible mode sensor 5, such as a TV vidicon tube.

The secondary mirror M2 is comprised of a meniscus lens concave to the object and has a thin film dielectric filter on its convex surface 6 for separating the visible from the laser light energy. More specifically, the thin film dielectric filter on the convex surface 6 of principal lens component M2/L4 is a dichroic filter which is reflecting to visible light energy but transparent to laser light energy, whereas the thin film dielectric filter on the concave surface 7 is a bandpass filter which eliminates wavelengths outside the laser spectrum. Thus, in the illustrated embodiment, the laser light energy reflected by the Mangin mirror M1 and redirected through corrector lens L3 passes through meniscus lens L4 to a fifth lens L5 which may be a positive meniscus lens concave to both the laser object and image. The fifth lens L5 focuses the laser light energy through an optically flat glass plate 8 onto laser detector 9. Glass plate 8 is typically a part of the laser detector assembly.

It is thus to be seen with regard to principal lens element M2/L4 that the spherical surface 7, here to concave surface, incorporates a narrow bandpass filter, with the spherical surface being of such configuration that converging rays are normal to its surface, thereby permitting the narrow bandpass filter to operate with minimum bandwidth, thus maximizing the rejection of unwanted background radiation. This result of course follows from the fact that the frequency of a bandpass filter changes with incidence angle, so therefore if the incidence angles are all the same, the frequency can closely approach a single frequency.

As earlier made clear, the surface of the lens element M2/L4 opposite surface 7 may incorporate a dichroic filter, enabling the lens element to operate in a dual mode, with the dichroic filter reflecting entering visible light energy but being transparent to laser light energy, and the narrow bandpass filter thereafter eliminating wavelengths outside a given laser spectrum. The optical coatings performing the separation of laser light energy are of course selected on a case by case basis, but in the preferred instance, the laser energy is at 1.06 micro meters. Significantly, the placement of the narrow bandpass blocking filter on surface 7 does not contribute in any way to stray light and glare in the visible optical path. Since both critical coatings are disposed on the two surfaces of a single optical element, good quality control can be achieved.

In the subject optical system, it will be appreciated that all of the optical elements are contained in the forward 30 percent of the optical path, and the resulting long clear-back-focal length enables multiple folding mirrors for system compactness. Moreover, the straight line relationship enables modular construction and testing of the objective system. With regard to the use of a transparent dome for protecting the components in some utilizations, it has been found that the radii of curvature of lens L1 are not critical to the imaging of the catadioptric objective system. Thus, considerable variation in dome size may be accommodated in the practice of the invention. In addition, the placement of the corrector lens L3 is also not critical, and that lens element may be located almost anywhere between lens L2 and Mangin mirror M1.

In the preferred embodiment of the invention, the catadioptric objective system comprising lenses L2 to L5 and Mangin mirror M1 together with folding mirrors 1, 2 and 3 and both visible and laser mode detectors 5 and 9 are designed to be rotatable in a gimbal mount about the center of curvature of the dome, and this mounting permits the objective system according to this embodiment to be rotated in such a manner as to scan a desired field of view.

Table 1 sets forth the design and dimensional relationships of the catadioptric objective system shown in the drawing. More specifically, all radii of curvature $r_1$ to $r_9$ and the thickness or spacing $d_1$ to $d_8$ of lenses L1 to L3 and mirrors M1 and M2 in Table 1 are normalized with respect to the focal length of the optical system for visible light. The dome radii can vary ± 25 percent as long as they are concentric. The ratio of the focal length of laser to visible optical path can be between 1:5 to 1:7. In addition the values in Table 1 can change 10 percent relative to each other. In Table 1, the refractive indices of all lens elements L1 to L5 are assumed to be that of any optical glass.

TABLE 1

| Lens or Mirror | Normalized Radius of Curvature | Normalized Thickness or Spacing |
|---|---|---|
| L1 | $\bar{r}_1 = 0.258$ | $\bar{d}_1 = 0.015$ |
|    | $\bar{r}_2 = 0.242$ |  |
|    |  | $\bar{d}_2{}^* = 0.0515$ |
| L2 | $\bar{r}_3 = 0.510$ |  |
|    | $\bar{r}_4 = 0.848$ | $\bar{d}_3 = 0.425$ |
|    |  | $\overline{d_4 + d_5 + d_6} = 0.121$ |
| L3 | $\bar{r}_5 = -0.234$ |  |
|    | $\bar{r}_6 = -0.234$ | $\bar{d}_5 = 0.018$ |

TABLE 1-continued

| | | |
|---|---|---|
| M1 | $\bar{r}_7 = -0.296$ | $\bar{d}_7 = 0.023$ |
|    | $\bar{r}_8 = -0.406$ |  |
|    |  | $\overline{d_4 + d_5 + d_6} = 0.098$ |
| M2/L4 | $\bar{r}_9 = -0.242$ | $\bar{d}_9 = 0.012$ |
|       | $\bar{r}_{10} = -0.106$ |  |
|       |  | $\bar{d}_{10} = 0.001$ |
| L5 | $\bar{r}_{11} = -0.041$ | $\bar{d}_{11} = 0.024$ |
|    | $\bar{r}_{12} = -0.034$ |  |
| Glass Plate |  | $\bar{d}_{12} = 0.033$ |
|             |  | $\bar{d}_{13} = 0.002$ |
|             |  | $\bar{d}_{14} = 0.008$ |

*Not critical

Using the design relationship set forth in Table 1, a specific embodiment of the invention was constructed in accordance with the dimensions and parameters set forth in Table 2. In Table 2 all linear dimensions are in inches.

TABLE 2

| Focal Length | 16.5 (visible mode) |
|---|---|
|  | 3.0 (Laser mode) |
| Back Focal Length | 5.6 (visible mode measured from rear vertex of Mangin mirror) |
| Aperture | 4.2 |
| f number | 3.9 |

| Lens or Mirror | Radius of Curvature | Thickness or Spacing | Refractive Index |
|---|---|---|---|
| L1 | $r_1 = 4.250^*$ | $d_1 = 0.250$ | $n_1 = 1.507$ |
|    | $r_2 = 4.000^*$ | $d_2 = 0.850$ |  |
| L2 | $r_3 = 8.346$ | $d_3 = 0.700$ | $n_2 = 1.602$ |
|    | $r_4 = 13.993$ | $d_4 = 1.050^*$ |  |
| L3 | $r_5 = -3.870$ | $d_5 = 0.295$ | $n_3 = 1.602$ |
|    | $r_6 = -3.870$ | $d_6 = 0.662^*$ |  |
| M1 | $r_7 = -4.942$ | $d_7 = 0.377$ | $n_4 = 1.569$ |
|    | $r_8 = -6.700$ | $d_8 = -0.662$ |  |
| M2/L4 | $r_9 = -4.000$ | $d_9 = -0.200$ | $n_5 = 1.507$ |
|       | $r_{10} = -1.750$ | $d_{10} = -0.020$ |  |
| L5 | $r_{11} = -0.673$ | $d_{11} = -0.390$ | $n_6 = 1.774$ |
|    | $r_{12} = -0.562$ |  |  |
| Glass Plate |  | $d_{12} = -0.550$ | $n_7 = 1.507$ |
|             |  | $d_{13} = -0.040$ |  |
|             |  | $d_{14} = -0.130$ |  |

*Not Critical

It will be apparent that the illustrated embodiment of my invention is only exemplary, and various modifications in construction and arrangement can be made within the spirit of this invention and the scope of the claims. For example, even though this invention has been related to a laser operative at 1.06 micro meters, obviously this invention is not to be so limited. Typically, the bandpass filter on surface 7 is responsible for a bandpass of 70A centered at 1.06 micro meters whereas, without the advantageous results made possible by the novel configuration of M2/L4, a 300A bandwidth would have been required.

I claim:

1. A dual-mode catadioptric objective system comprising a positive meniscus lens convex to the object, a Mangin mirror concave to the object and spaced from said positive lens, a negative meniscus lens having a thin film dielectric filter on its one surface for separating visible light from laser light, and a thin film dielectric background blocking filter on its other surface, latter lens serving as a secondary mirror for visible light and serving to focus such visible light behind said Mangin mirror, latter lens also being transparent to laser light, and means for focusing laser light on a selected object.

2. An objective system as recited in claim 1 further comprising a visible mode detector positioned at the point of focus of visible light and a laser mode detector positioned at the point of focus of laser light.

3. An objective system as recited in claim 2 further comprising a plurality of planar mirrors located behind said Mangin mirror for folding the visible light path from said secondary mirror to the point of focus of visible light.

4. The objective system as recited in claim 1 wherein a transparent dome encloses substantially all of said objective system, said objective system being rotatable about the center of curvature of said dome.

5. The objective system as defined in claim 1 wherein a transparent dome encloses substantially all of said objective system, and the balance of the lens system is rotatable about a point adjacent to the rear vertex of said Mangin mirror, and further comprises a plurality of planar mirrors located behind said Mangin mirror for folding the visible light path from said secondary mirror to the point of focus of visible light.

6. The objective system as defined in claim 1 in which said lenses are enclosed in a transparent dome, and a meniscus lens concave to the dome is utilized in said system for the purpose of maintaining image quality.

7. A dual-mode catadioptric objective system comprising a first negative meniscus lens convex to the object, a second positive meniscus lens convex to the object and spaced from said first lens by a first predetermined distance, a Mangin mirror concave to the object and spaced from said second lens by a second predetermined distance, a corrector lens concave to the object and positioned between said second lens and said Mangin mirror, a third negative meniscus lens having a thin film dielectric filter on its convex surface for separating visible light from laser light and a thin film dielectric background blocking filter on its concave surface, said third lens serving as a secondary mirror for visible light and convex to the visible image and positioned between said second lens and said corrector lens and spaced from said Mangin mirror by a third predetermined distance for focusing visible light behind said Mangin mirror, said third lens being transparent to laser light, and a fourth positive meniscus lens concave to the laser image and spaced from said third lens by a fourth predetermined distance for focussing laser light.

8. An objective system as recited in claim 7 characterized by the following parameters:

| Lens or Mirror | Normalized Radius of Curvature | Normalized Thickness or Spacing |
|---|---|---|
| L1 | $\bar{r}_1 = 0.258$ | $\bar{d}_1 = 0.015$ |
|    | $\bar{r}_2 = 0.242$ |  |
|    |  | $\bar{d}_2^* = 0.515$ |
| L2 | $\bar{r}_3 = 0.510$ |  |
|    | $\bar{r}_4 = 0.848$ | $\bar{d}_3 = 0.425$ |
|    |  | $\overline{d_4 + d_5 + d_6} = 0.121$ |
|    | $\bar{r}_5 = -0.234$ |  |
| L3 | $\bar{r}_6 = -0.234$ | $\bar{d}_5 = 0.018$ |
|    | $\bar{r}_7 = -0.296$ |  |

-continued

| Lens or Mirror | Normalized Radius of Curvature | Normalized Thickness or Spacing |
|---|---|---|
|  |  | $\bar{d}_7 = 0.023$ |
| M1 | $\bar{r}^8 = -0.406$ |  |
|  |  | $\overline{d_8 + d_5 + d_6} = 0.098$ |
| M2/L4 | $\bar{r}_9 = -0.242$ | $\bar{d}_9 = 0.012$ |
|  | $\bar{r}_{10} = -0.106$ |  |
|  |  | $\bar{d}_{10} = 0.001$ |
| L5 | $\bar{r}_{11} = -0.041$ | $\bar{d}_{11} = 0.024$ |
|  | $\bar{r}_{12} = -0.034$ |  | wherein $\bar{r}_1$ and $\bar{r}_2$ and $\bar{d}_1$ are the radii of curvature and thickness, respectively, of said first lens $L_1$, $\bar{d}_2$ is said first predetermined distance, $\bar{r}_3$ and $\bar{r}_4$ and $\bar{d}_3$ are the radii and thickness of said second lens L2, $\overline{d_4 + d_5 + d_6}$ is said second predetermined distance, $\bar{r}_9$ and $\bar{r}_{10}$ and $\bar{d}_9$ are the radii of curvature and thickness, respectively, of said third lens $L_4$, $\bar{d}_{10}$ is said fourth predetermined distance, and $\bar{r}_{11}$ and $\bar{r}_{12}$ and $\bar{d}_{11}$ are the radii of curvature and thickness, respectively, of said fourth lens $L_5$, all of said radii, thickness, and distances being normalized with respect to the focal length of said objective system for visible light, said lenses and said Mangin mirror being made of any suitable optical material.

9. An objective system as recited in claim 7 further comprising a visible mode detector positioned at the point of focus of visible light and a laser mode detector positioned at the point of focus of laser light.

10. An objective system as recited in claim 9 further comprising a plurality of planar mirrors located behind said Mangin mirror for folding the visible light path from said secondary mirror to the point of focus of visible light.

11. An objective system as recited in claim 10 wherein said first lens is fixed and comprises a part of a transparent dome enclosing the balance of said objective system, said balance of said objective system being rotatable about the center of curvature of said dome.

12. An objective system as recited in claim 10 further comprising a visible mode detector positioned at the point of focus of visible light and a laser mode detector positioned at the point of focus of laser light.

13. An objective system as recited in claim 10 further comprising a plurality of planar mirrors located behind said Mangin mirror for folding the visible light path from said secondary mirror to the point of focus of visible light.

14. An objective system as recited in claim 7 wherein said first lens is fixed and the balance of said objective lens is rotatable about a point adjacent to the rear vertex of said Mangin mirror and further comprising a plurality of planar mirrors located behind said Mangin mirror for folding the visible light path from said secondary mirror to the point of focus of visible light.

15. An objective system as recited in claim 7 characterized by the following parameters wherein $r_1$ to $r_{12}$ are radii of curvature, $d_1$ to $d_{11}$ are the thickness or separation and $n_1$ to $n_6$ are the refractive indices of lenses L1 to L5 or mirrors M1 and M2:

| Lens or Mirror | Radius of Curvature | Thickness or Spacing | Refractive Index |
|---|---|---|---|
| L1 | $r_1 = 4.250^*$ | $d_1 = 0.250$ | $n_1 = 1.507$ |
|    | $r_2 = 4.000^*$ |  |  |
|    |  | $d_2 = 0.850^*$ |  |

-continued

| Lens or Mirror | Radius of Curvature | Thickness or Spacing | Refractive Index |
|---|---|---|---|
| L2 | $r_3 = 8.346$ | $d_3 = 0.700$ | $n_2 = 1.602$ |
|  | $r_4 = 13.993$ | $d_4 = 1.050^*$ |  |
| L3 | $r_5 = -3.870$ | $d_5 = 0.295$ | $n_3 = 1.602$ |
|  | $r_6 = -3.870$ | $d_6 = 0.662^*$ |  |

-continued

| Lens or Mirror | Radius of Curvature | Thickness or Spacing | Refractive Index |
|---|---|---|---|
| M1 | $r_7 = -4.942$ | $d_7 = 0.377$ | $n_4 = 1.569$ |
|  | $r_8 = -6.700$ | $d_8 = -0.662^*$ |  |
| M2/L4 | $r_9 = -4.000$ | $d_9 = -0.200$ | $n_5 = 1.507$ |
|  | $r_{10} = -1.750$ | $d_{10} = -0.020$ |  |
| L5 | $r_{11} = -0.673^*$ | $d_{11} = -0.390^*$ | $n_6 = 1.774$ |
|  | $r_{12} = -0.562^*$ |  |  |

* * * * *